Sept. 5, 1939. G. W. SCHEURICH 2,171,899
LIQUID GAUGE
Filed June 3, 1938
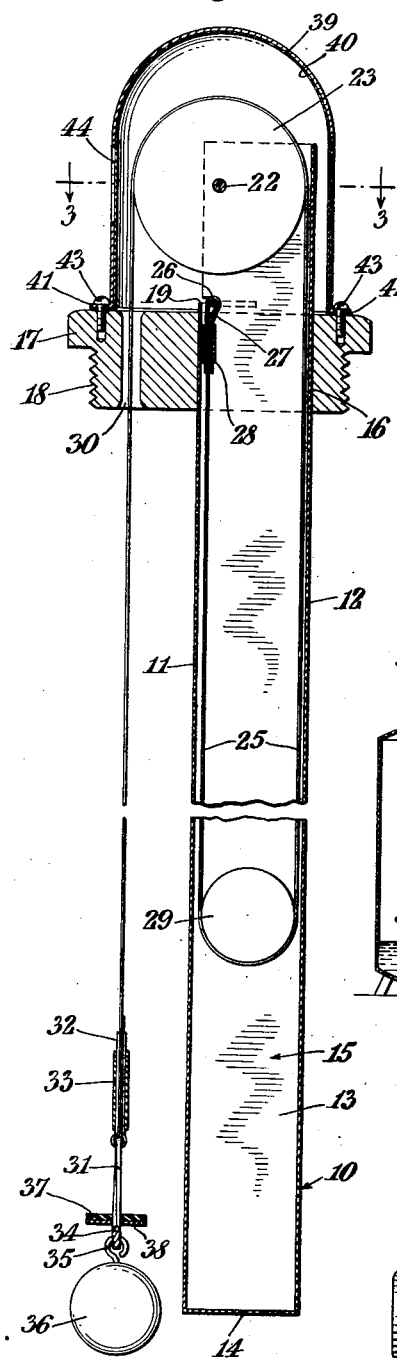
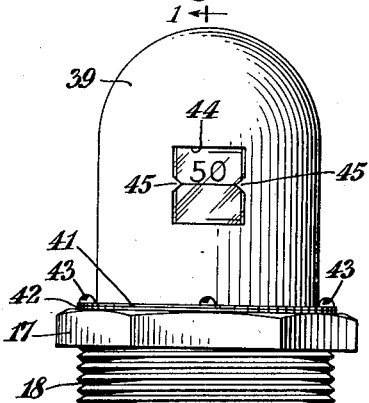
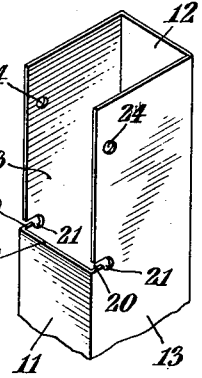
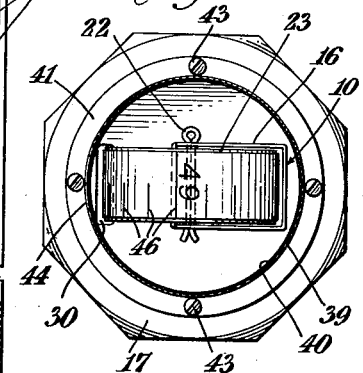
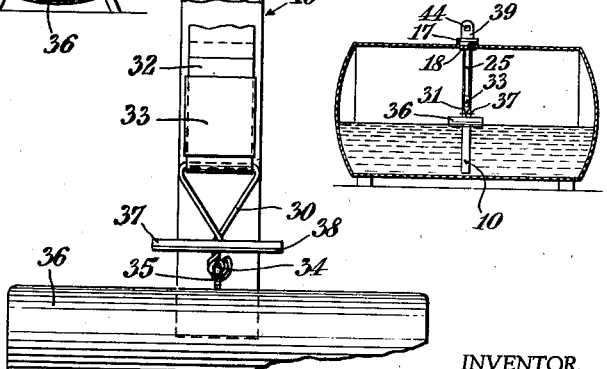
INVENTOR.
George William Scheurich
BY
his ATTORNEY.

Patented Sept. 5, 1939

2,171,899

UNITED STATES PATENT OFFICE 2,171,899

LIQUID GAUGE

George William Scheurich, New York, N. Y.

Application June 3, 1938, Serial No. 211,519

3 Claims. (Cl. 73—321)

This invention relates to gauges for measuring liquids in storage tanks.

More particularly, the invention aims to provide a novel and valuable liquid measuring gauge of the type including a graduated band, strap or tape or other elongate flexible element having volumetric calibrations along its length, and of the type wherein said element, hereinafter for convenience called the tape, is reversely bent on itself to include a depending length or stretch and an upwardly extending length or stretch, and is endwisely moved past a suitable reading station by a float connected to the tape and coacting with the liquid level in the tank.

The present invention is directed toward the elimination of various difficulties present in previous proposals; such, for instance, as complexities of structure, bulk of the assemblage, wastage of liquid incidental to measuring, projections highly upstanding above the tank, inapplicability to tanks already buried in the ground, placement of moving parts into the body of the liquid, inaccuracies of readings and inability readily to correct for these, troubles due to the weight of the tape itself interfering with the prevised counterbalancing of the float, the necessity of providing many sizes or types of gauge where many different sizes of tanks are to be gauged, and so on.

By the present invention there is provided a simple, comparatively inexpensive and highly accurate gauge for measuring the quantity of any kind of liquid in a storage tank. Since the invention has been made especially with the idea of providing such a gauge for a fuel tank, some of its novel features to be particularly mentioned in this connection (and generally equally important in measuring other kinds of liquids) are those referred to briefly immediately below, and one or more of which are desirably incorporated in any gauge according to the invention regardless of the kind of liquid to be gauged.

By virtue of these features, a gauge pursuant to the invention can be small and compact and readily portable yet completely self-contained as an attachment instantaneously mountable on or demountable from any one of a plurality of tanks of different kinds, shapes and capacities; any wastage of the liquid being measured is absolutely prevented; no pulley or other guiding means for the tape has to be submerged in the liquid; all working parts and the entire device can form a single vertically slenderized structure topped by a screw-plug or the like fittable in the usual filling hole at the top of the tank, so that conveniently the reading station can be carried by this plug; a columnar structure upstanding above the tank or above any inlet connection thereto is obviated; etc., etc.

A particular object of the invention is to provide a liquid measuring gauge wherein the measuring capacity of the gauge is such that it is operable to measure the contents of a storage tank having a depth which is much greater than the maximum vertical dimension of the gauge.

In the accompanying drawing, wherein is illustratively shown an at present favored embodiment of the invention constructed in accordance with the foregoing preferences and so as to attain the object just stated:

Fig. 1 is a longitudinal vertical section, taken on the line 1—1 of Fig. 2.

Fig. 2 is a front elevational view, looking toward the right in Fig. 1.

Fig. 3 is a horizontal section, taken on the line 3—3 of Fig. 2.

Fig. 4 is a detail view, being a fragmentary perspective showing the upper part of a columnar chamber which I call the compensating well.

Figs. 5 and 6 are views on a reduced scale, showing various forms of tanks in vertical section and illustrating my device in use therewith.

In the device as shown, the compensating well just mentioned and closed at its bottom as shown in Fig. 1, together with the screw-plug shown in elevation at the top of Fig. 2, constitutes the entirety of the housing structure for the working parts. As a further result of the provision of these means, float and weight means are present in such way that the action of the float is not necessarily a function of the action of the weight, and hence the difficulty of properly counterbalancing the weight of the comparatively heavy tape is avoided.

Otherwise stated, there is provided by the present invention a tape, weight and float combination such that the measuring capacity of the attachment is, in terms of the depth of the tank, a multiple of the length of the part (the compensating well aforesaid) to be inserted down into the tank. As the invention is illustrated in a simple form in the drawing, the measuring capacity of the gauge is twice that of the length of the compensating well; in other words, this length last-mentioned need be one-half only of the depth of the tank, yet the contents of the tank can be volumetrically gauged down to the very bottom of the tank, and so one standard size of the attachment of the invention can be provided for a multiplicity of tanks of different shapes and capacities and yet for full reading efficiency in regard to each of these tanks.

The horizontal cross-section of the compensating well, as will be noted, can be very small, so as to be, as aforesaid, dependable from and part of an integral structure with a screw-cap or the like of standard diameter, and hence adapted to be substituted for the usual similar fitment which ordinarily closes the filling hole of the tank. One important advantage is that any tank already buried in the ground or otherwise in permanent placement can be served by the gauge of the invention, following practically instantaneous temporary mounting of the gauge in place.

A feature of the invention, as is clearly shown in the drawing, is the provision of a plurality of bight-guiding means for the tape, so arranged that there are at least three substantially parallel stretches of the tape; that is, in addition to a depending stretch exterior to the compensating well and carrying the float, there are two other stretches inside the well, one downwardly and the other upwardly extending and both operatively associated with the weight.

Another feature of the invention, as is also clearly shown in the drawing, is the establishment of the two stretches last-mentioned by coaction of the tape with a bight forming and guiding means of a peculiar type, and which, for convenience, and more or less aptly, I call a floating roller. The arrangement is such, as will be noted, that this roller is held to rotation about an imaginary shaft by coaction of the compensating well and the tape, regardless of variations in the height of said roller in the well brought about by endwise movements of the tape in response to movements of the float in agreement with rises and falls of the liquid level in the tank.

The foregoing and other advantages of the invention will be more clearly understood from the following detailed description of the exemplifying form of the invention illustrated in the drawing.

The numeral 10 denotes the compensating well, conveniently a sheet metal housing and shown as rectangular and substantially square in cross-section; the same including a front wall 11, a rear wall 12, side walls 13, and a bottom wall 14. These walls are so joined, as by soldering or in any other suitable manner, to form a liquid-tight chamber 15.

The upper end of this housing passes through and is suitably permanently secured in an aperture 16 of a cap or plug 17, having a threaded part 18 designed to be screwed into the usual tapped filling hole of a standard tank or to be screwed into a suitably threaded bushing (not shown) which may be readily applied to any desired part of a tank.

The lower end of the housing or well 10, that is, the portion thereof extending below the threaded portion 18 of the plug 17 is desirably of a length to reach approximately the bottom of a horizontal tank such as shown in Fig. 5.

The front wall 11 terminates below the top of the walls 12 and 13, and at this level 19 slots 20 are extended back in side walls 13 and at their inner ends communicate with pockets 21.

A shaft 22, in this case shown as a cotter-pin, carries a roller 23, and is mounted in apertures 24 in side walls 13.

The tape is indicated at 25. One end thereof is folded around a wire 26, and so as to extend along opposite sides of a thin metal reinforcing strip 27, and these parts are clamped together by a flattened collar 28. This wire is at its opposite ends seated in pockets 21 and there suitably secured in place.

The tape 25 extends downward in the chamber 15, then cradlingly around and under the floating roller, 29, and then upward in the chamber. After passing around and over roller 23, the tape passes down again, through a slot 30 in the plug 17 and so to provide a depending stretch outside the compensating well 10.

The lower end of this depending tape stretch is folded around a wire 31, and so as to extend along opposite sides of a thin metal reinforcing strip 32, and these parts are clamped together by a flattened collar 33.

The end portions of the wire 31 are twisted together to form a loop 34, which engages a hook 35 on a float 36. The twist of the wire 31 passes through a plate 37, preferably made of cork; the plate 37 resting on a metal piece having an aperture so engaging the wire twist as to hold this metal piece, marked 38, substantially horizonal.

When the float 36 reaches its uppermost position in a full tank, the valve- or gasket-means constituted by the plate 37 closes the slot 30 of the plug 17 and thus prevents any possibility of entry of the liquid into the interior of the plug.

This plug interior is partly established by a dome-shaped housing 39, having therein a transparent liner 40, conveniently a molded shell of glass, Celluloid or the like; and the housing 39 is provided with a flange 41, and by means of a gasket 42 and screws 43 is tightly connected up into the composite structure comprising the plug 17.

The housing 39 has a square opening 44, interrupted at its opposite sides by horizontally aligned pointers or indices 45; thus providing the equivalent of a hair-line for reading the calibrations 46 of the tape. A conveniently adjustable fine wire, to constitute such hair-line index, is recommended where very accurate readings are desired; to allow for stretch, shrinking, liquid-soaking or other factors which on special occasions or under special conditions would modify the length of the tape. Such a refinement is not illustrated, in order to simplify the drawing; but, as known in various arts and as will be readily understood, it would be a simple matter to install such an adjustable index, and one readily adjustable from the exterior of the attachment, as by providing screws sent through the housing 39 with their heads outside the housing and their free ends tapped into vertically movable blocks suitably guided to vertical lines of travel and having extended between them a fine wire opposite the inner face of the portion of the dome liner 40 constituting the window at the opening 44.

The float 36 is somewhat heavier than the floating roller 29, and so riding of the float on the surface of the liquid is insured at all times. The function of the roller 29 is to keep the tape 25 under slight tension so as to take up any slack which occurs incident to upward movements of the float.

The fastening means 27—28 and 32—33 for the opposite ends of the tape 25 provide simple and quick expedients for assembling or replacing the tape should the latter ever become necessary.

As only the float contacts the liquid being measured, no impurities can be carried into the moving parts to prevent their operation exactly as intended.

The part of the tape 25 inside the compensating well 10 being of double length, that is, substantially twice as long as the well, the device is adapted to a tank having a vertical diameter twice the length of the well. Compare, in this connection, Fig. 6 with Fig. 5.

While I have shown and described what I now believe to be a very satisfactory and practical structure according to the invention, it will be understood that various changes and modifications can be resorted to within the scope of the appended claims, and parts of the improvements can be used without others.

I claim:

1. A gauge for measuring liquids including a tape having calibrations therealong and having a depending extension; a float connected to said extension; a reading station for said calibrations; and means for guiding said tape to cause the same to vary the calibration to be read at said station in accordance with rise or fall of the float, said guiding means including a pulley on a fixed axis and a water-tight well-like chamber below said pulley and having a pair of substantially parallel walls, said guiding means further including means permitting endwise movement of the tape past said station while holding the tape in said chamber in a plurality of oppositely extending substantially parallel stretches joined by an upwardly facing bight in the tape, the means last-mentioned including said parallel walls and a floating roller cradled in said bight and with its opposite ends facing said walls.

2. A self-complete attachment for an opening in the upper portion of a liquid storage tank, including a structure incorporating a fitment securable to the tank at said opening and a columnar liquid-tight chamber depending from said fitment; a graduated measuring tape, said structure having an aperture through which different graduations on the tape are displayed according as a different part of the length of the tape is at said aperture; a float connected to the tape near one end thereof, the tape near its other end being secured to said structure; means including a roller overlying said chamber and over which the tape passes for guiding the tape to have a plurality of reversely directed stretches including one depending exteriorly of the chamber toward the float and at least two others within the chamber between said depending stretch and the point of securement of the tape to said structure, said structure having a slot in the bottom of said fitment through which the tape passes in the stretch thereof suspending the float; and a valve-member for closing said slot and connected to the tape stretch last-mentioned at a point above the float.

3. A device of the kind described including a supporting structure for a calibrated tape and to which the tape is connected near one end; a float suspended by the tape near its other end; a cylindrical weight suspended by the tape intermediate its ends; and guiding means for the tape to dispose the same in a depending stretch and an immediately adjoining upwardly extending stretch, in the bight between which stretches said weight is cradled, said guiding means including a vertically elongated housing providing a well have angularly related pairs of substantially parallel walls, between and substantially parallel with one of which two wall pairs the two stretches last-mentioned extend, and between the other of which wall pairs the axis of said cylindrical weight extends.

GEORGE WILLIAM SCHEURICH.